(12) United States Patent
Topatan et al.

(10) Patent No.: US 10,263,977 B2
(45) Date of Patent: *Apr. 16, 2019

(54) DIRECTORY DRIVEN MAILBOX MIGRATIONS

(71) Applicant: Microsoft Technology Licensing, LLC, Redmond, WA (US)

(72) Inventors: Kutlay Topatan, Seattle, WA (US); Maxim Ivanov, Redmond, WA (US); Victor Boctor, Redmond, WA (US); Palash Biswas, Redmond, WA (US); Bernard Luke Gallagher, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,853

(22) Filed: Sep. 18, 2017

(65) Prior Publication Data

US 2018/0007036 A1    Jan. 4, 2018

Related U.S. Application Data

(63) Continuation of application No. 13/007,095, filed on Jan. 14, 2011, now Pat. No. 9,769,150.

(51) Int. Cl.
*G06Q 10/10* (2012.01)
*H04L 29/06* (2006.01)
*H04L 12/58* (2006.01)

(52) U.S. Cl.
CPC ....... *H04L 63/0823* (2013.01); *G06Q 10/107* (2013.01); *H04L 51/22* (2013.01)

(58) Field of Classification Search
CPC .... H04L 63/0823; H04L 51/22; G06Q 10/107
See application file for complete search history.

(56) References Cited

U.S. PATENT DOCUMENTS 6,938,039 B1 * 8/2005 Bober ............... G06F 17/30079
707/704
8,122,085 B2   2/2012 Midgley
8,856,376 B1  10/2014 Watson et al.
(Continued)

OTHER PUBLICATIONS

"[MS-OXMVMBX]: Mailbox Migration Protocol Specification" v1.0, Microsoft Corporation © 2008, 8 pages.
(Continued)

*Primary Examiner* — Farid Homayounmehr
*Assistant Examiner* — Zhimei Zhu
(74) *Attorney, Agent, or Firm* — Merchant & Gould

(57) ABSTRACT

An example method for migrating communication data from a source server to a target server includes obtaining, using a computing device, a set of credentials to access the source server, and accessing the source server using the set of credentials. The method also includes requesting, automatically by the computing device, a directory structure associated with communication data from the source server, populating, by the computing device, the target server using the directory structure, requesting the communication data from the source server, and populating the target server with the communication data.

20 Claims, 6 Drawing Sheets

(56) References Cited

U.S. PATENT DOCUMENTS

| | | | |
|---|---|---|---|
| 9,235,641 B1* | 1/2016 | Kumar | G06F 17/30864 |
| 9,769,150 B2 | 9/2017 | Topatan et al. | |
| 2003/0073494 A1* | 4/2003 | Kalpakian | G07F 17/32 |
| | | | 463/42 |
| 2004/0243576 A1 | 12/2004 | Shrivastava et al. | |
| 2004/0267890 A1 | 12/2004 | Soulet | |
| 2005/0058263 A1 | 3/2005 | Frazier | |
| 2007/0130464 A1 | 6/2007 | Swedor et al. | |
| 2007/0150499 A1 | 6/2007 | D'Souza et al. | |
| 2007/0244996 A1* | 10/2007 | Ahmed | G06Q 10/107 |
| | | | 709/220 |
| 2007/0276846 A1 | 11/2007 | Ramanathan et al. | |
| 2008/0288559 A1 | 11/2008 | Ahmed et al. | |
| 2009/0187632 A1 | 7/2009 | Alarid et al. | |
| 2010/0011033 A1 | 1/2010 | Czeczulin | |
| 2010/0250498 A1* | 9/2010 | Andersen | G06Q 10/10 |
| | | | 707/661 |
| 2011/0264748 A1* | 10/2011 | Pouzin | G06F 9/5011 |
| | | | 709/206 |
| 2013/0061291 A1* | 3/2013 | Hegg | G06F 21/33 |
| | | | 726/4 |
| 2016/0072749 A1* | 3/2016 | Lu | H04L 51/12 |
| | | | 709/206 |

OTHER PUBLICATIONS

"How to use the Exchange Migration Wizard to migrate mailboxes from an Exchange organization" Article ID: 2269379—Last Review: Jun. 30, 2010—Revision: 1.1, Microsoft Corporation © 2011, 4 pages.

"Microsoft Online—Business Productivity Online Suite: Establish E-Mail Coexistence Part 3" © MMCUG—Midwest Messaging and Collaboration User Group 2008, 8 pages.

Bilic, Nino; "Inter-Organizational Migration to Exchange Server 2003 Using Exchange Server Migration Wizard—Part 2" last modified Dec. 14, 2005; Microsoft Corporation © 2011, 4 pages.

Byrne, R. Programming Applications for Microsoft® Office Outlook® 2007. Microsoft Press, Feb. 28, 2007. section 3.4.4.2.8.

McCorry, K. Microsoft Exchange Server 2003, Deployment and Migration SP1 and SP2. Digital Press, Aug. 22, 2006, p. 206-208.

Boswell, W. Learning Exchange Server 2003, Addison-Wesley Professional, Sep. 20, 2004, p. 193.

* cited by examiner

DIRECTORY DRIVEN MAILBOX MIGRATIONS

CROSS REFERENCE TO RELATED APPLICATION

This application is a continuation of application Ser. No. 13/007,095, filed Jan. 14, 2011, and assigned U.S. Pat. No. 9,769,150, which is incorporated herein by reference in its entirety.

BACKGROUND

Many institutions are moving email services from on-premise installations to hosted solutions. The process of moving an established email system to a hosted environment can be significant. It is usually necessary for the directory structure to be replicated in the hosted environment before the data associated with each user's mailbox can be sent. The replication of this directory structure can be difficult and require additional software and/or hardware to be installed locally to allow for the replication. This complexity can lead to inefficient processes and errors during the migration process.

SUMMARY

In one aspect, a method for migrating data from a source server to a target system includes: obtaining, using a computing device, a set of credentials to access the source server; accessing the source server using the set of credentials; requesting, automatically by the computing device, a directory structure associated with communication data from the source server; populating, by the computing device, the target system using the directory structure; requesting the communication data from the source server; and populating the target system with the communication data.

In another aspect, a computing device includes: a processing unit; and a system memory connected to the processing unit, the system memory including instructions that, when executed by the processing unit, cause the processing unit to: access a source server; request a directory structure associated with communication data from the source server; populate a target server using the directory structure; request the communication data from the source server; and populate the target server with the communication data.

In yet another aspect, a computer readable storage medium has computer-executable instructions that, when executed by a computing device, cause the computing device to perform steps comprising: obtaining, using the computing device, an email address and a password of a user of a source server; using autodiscover based on the email address to identify addressing information associated with the source server; accessing the source server using the addressing information and the password; requesting, automatically by the computing device, an offline address book from the source server over a Name Service Provider Interface (NSPI) protocol; populating, by the computing device, a target server using the offline address book, including creating one or more mailboxes for one or more users identified in the offline address book, and the target server being a hosted server; requesting communication data, including email items and calendar items, from the source server; populating the mailboxes on the target server with communication data; and reporting a status of a migration of the communication data to the user.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to the migration of communication data, such as email items, calendar items, task items, etc., from a source server to a target server.

In some examples, the systems and methods described herein allow for the automated migration of communication data from a source server, which is located on-premise, to a target server, which is typically one or more hosted servers. A complete migration process is provided by: (i) re-creating the on-premise directory structure at the target server, and (ii) thereupon migrating the communication data from source server to the target server.

For example, in one embodiment, a company decides to move its communication data, including all email items, calendar items, task items, etc., from an on-premise installation to a hosted solution. To do so, the company selects a cloud service that hosts an email solution off-premise for the company.

Once the cloud service is selected, an administrator for the on-premise installation provides credentials to a migration system to initiate the migration. These credentials provide the migration system with administrative access to the on-premise communication server. The migration system accesses the on-premise communication server and obtains a copy of the directory structure associated with the communication server.

The migration system uses the directory structure to populate the directory structure at the target communication server in the cloud. For example, the directory structure is used to populate mailboxes and distribution groups on the target communication server. Once populated, the migration system accesses the communication data on the on-premise server initiates a migration of the communication data from the on-premise communication server to the newly-populated mailboxes on the target communication server in the cloud.

In this example, the migration process is automated. The administrator provides his or her credentials. The migration system thereupon downloads the directory structure, populates the target space, and migrates the data. The migration system reports the status and any errors associated with the migration to the administrator during the migration process.

Figure 1:
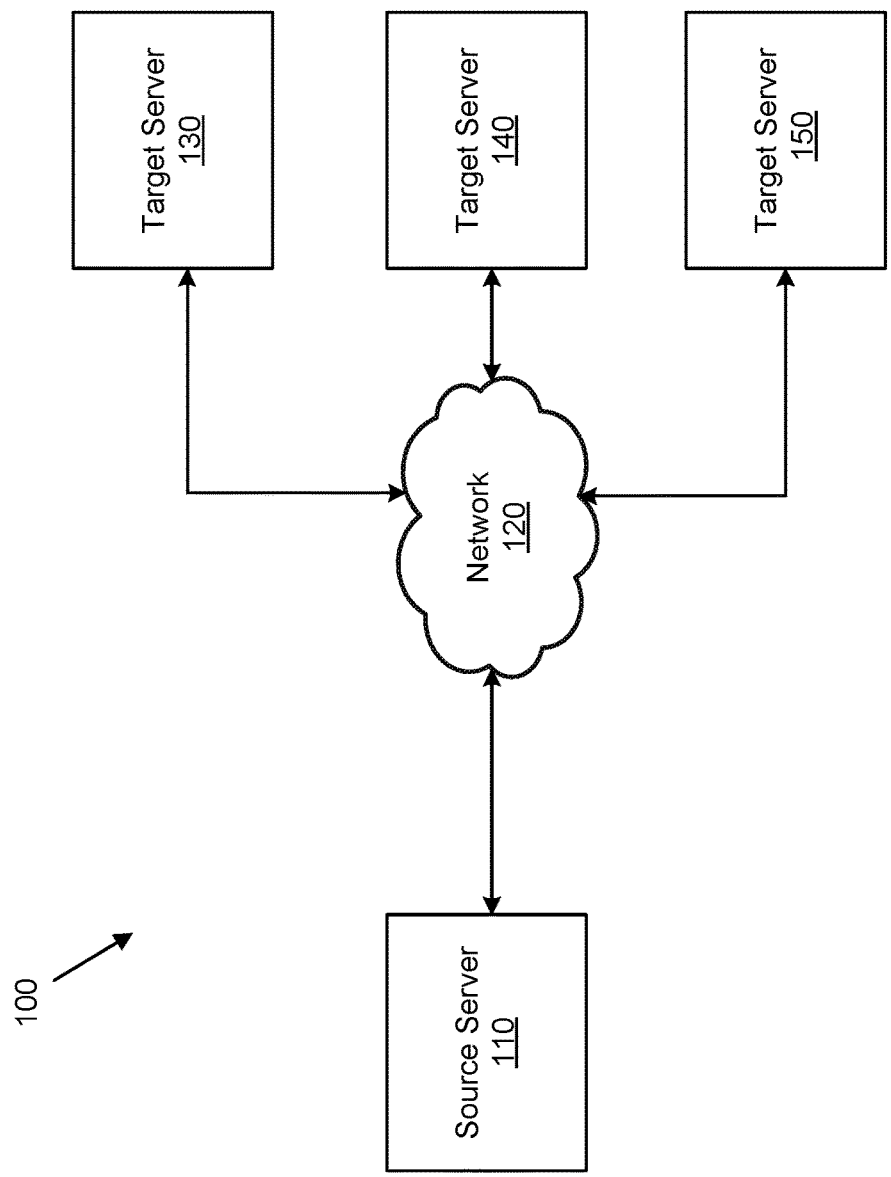
FIG. 1 shows an example networked computing environment.

Referring now to FIG. 1, an example networked computing environment 100 is shown. The environment includes a source server 110, a network 120, and target servers 130, 140, 150.

The source server 110 is typically one or more computing devices hosting one or more business applications. For example, the source server 110 can include an Exchange Server from Microsoft Corporation of Redmond, Wash. The Exchange Server is an example of a business server that implements messaging and collaborative business processes.

Typically, the source server 110 is part of a corporate network, such as a local area network or wide area network, that is positioned behind a firewall. For example, in a corporate environment, the source server 110 is a network of computing devices maintained by a business. One or more Exchange Servers are part of the source server 110 and provide communication and collaborative services, such as email, calendar, tasks, journals, etc.

The network 120 is a bi-directional data communication path for data transfer between one or more devices. In the example shown, the network 120 establishes a communication path for data transfer between the source server 110 and the target servers 130, 140, 150. In general, the network 120 can be of any of a number of wireless or hardwired WAN, LAN, Internet, or other packet-based communication networks such that data can be transferred among the elements of the networked computing environment 100. Other embodiments of the network 120 are possible as well.

The target servers 130, 140, 150 are one or more servers that are accessible through the network 120. In this example, the target servers 130, 140, 150 each host cloud services, including communication services such as email, calendar, task, etc.

For example, the target server 130 can host an Exchange Server that is accessible through the network 120. The target server 130 thereby provides a hosted solution for communication data to one or more individuals or businesses.

Figure 2:
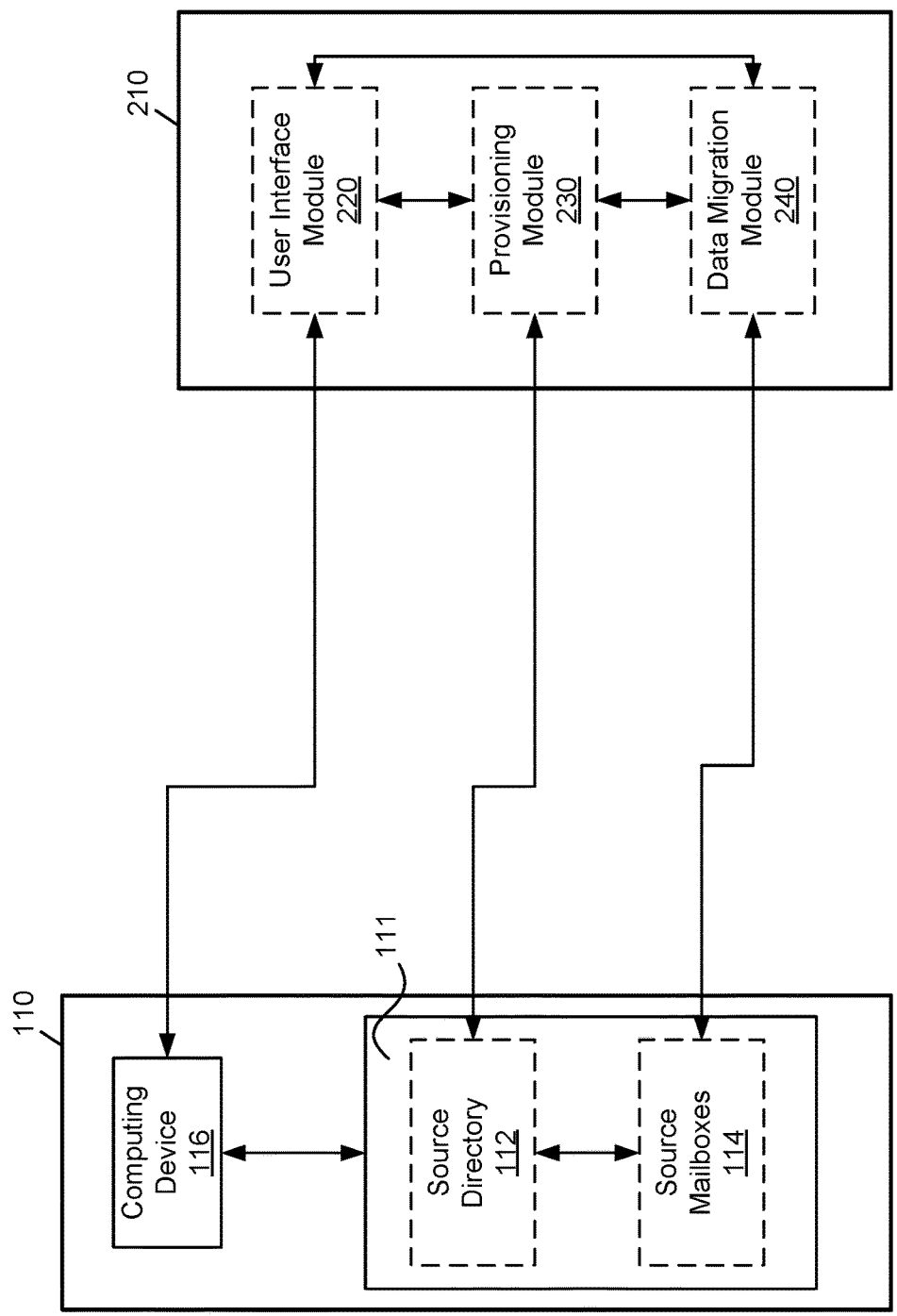
FIG. 2 shows details of a source server from the networked computing environment of FIG. 1 and an example migration system.

Referring now to FIG. 2, the source server 110 is shown in more detail. The source server 110 includes a communication server 111 with a source directory structure 112 and source mailboxes 114.

In one example, the source directory structure 112 includes a directory structure, such as the directory of addresses associated with the communication server 111 of the source server 110. This can include the offline address book used by the Exchange Server to store email addresses, distribution lists, etc., associated with the communication server 111.

The source mailboxes 114 are the one or more message stores that include all of the messaging data for the source server 110, such as email items, calendar items, task items, journal items, etc. The message stores are included as part of the Exchange System.

The source server 110 also includes a computing device 116. The computing device 116 can be located within or outside the corporate network. In one example, the computing device 116 includes a local application or web browser that is used by an administrator or other individual that has access to the communication server 111. As described further below, the computing device 116 can be used by the administrator to initiate the migration process.

FIG. 2 also shows a migration system 210 that is configured to automate the migration of the information included in the communication server 111 to a target system, such as a hosted solution like the target servers 130, 140, 150.

In this example, the migration system 210 includes a user interface module 220, a populating module 230, and a data migration module 240.

The user interface module 220 provides a user with information about the migration process. This information can include both information to initiate the process, as well as status information as the migration process progresses and is completed. See, e.g., FIG. 6.

The populating module 230 obtains information to allow the populating module 230 to populate the target system in preparation for transfer of the communication data to the target server. In this example, the populating module 230 obtains directory structure from the source directory structure 112. This directory structure is used to build the structure necessary to support the communication data that will be migrated from the communication server 111 to the target server, like target servers 130, 140, 150.

In example embodiments, the migration system 210 is incorporated as part of the target servers 130, 140, 150. For example, the migration system 210 can be provided as a service on the target server 130. In another example, the migration system 210 is a separate system that facilitates the transfer from the communication server 111 in the source server 110 to one of the target servers 130, 140, 150.

Figure 3:
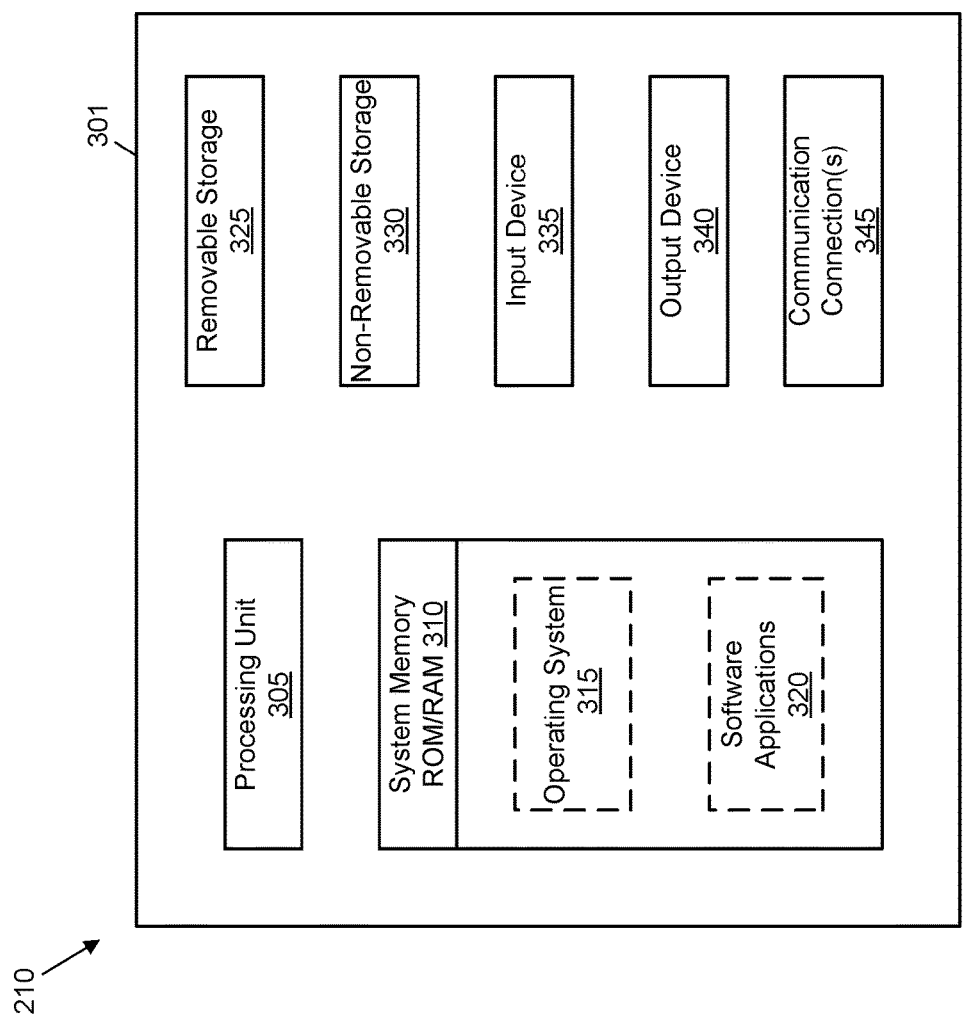
FIG. 3 shows an example server computing device of the migration system of FIG. 2.

Referring now to FIG. 3, in example embodiments, the migration system 210 includes one or more computing devices, such as a computing device 301. The computing device 301 includes at least one processing unit 305 and a system memory 310. The system memory 310 can store an operating system 315 for controlling operation of the migration system 210 or another computing device. One example operating system 315 is WINDOWS® operating system from Microsoft Corporation.

The system memory 310 may also include one or more software applications 320 and may include program data. Software applications 320 may include many different types of single and multiple-functionality programs, such as an electronic mail program, a calendaring program, an Internet browsing program, a spreadsheet program, a program to track and report information, a word processing program, and many others. Examples of such software are the Exchange Server and Office suite of applications from Microsoft Corporation.

The system memory 310 can include physical computer readable storage media such as, for example, magnetic disks, optical disks, or tape. Such additional storage is illustrated in FIG. 3 by removable storage 325 and non-removable storage 330. Computer readable storage media can include physical volatile and nonvolatile, removable and non-removable media implemented in any method or technology for storage of information, such as computer readable or computer-executable instructions, data structures, program modules, or other data.

Computer readable storage media can also include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the migration system 210. Any such computer storage media may be part of or external to the migration system 210.

Communication media is distinguished from computer readable storage media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The migration system 210 can also have any number and type of an input device 335 and output device 340. An example input device 335 includes a keyboard, mouse, pen, voice input device, touch input device, and others. An example output device 340 includes a display, speakers, printer, and others. The migration system 210 can also contain a communication connection 345 configured to enable communications with other computing devices over a network (e.g., network 120 of FIG. 1) in a distributed computing system environment.

In example embodiments, the various other servers and systems described herein can include one or more computing devices 301 configured in a manner similar to that shown in FIG. 3.

Figure 4:
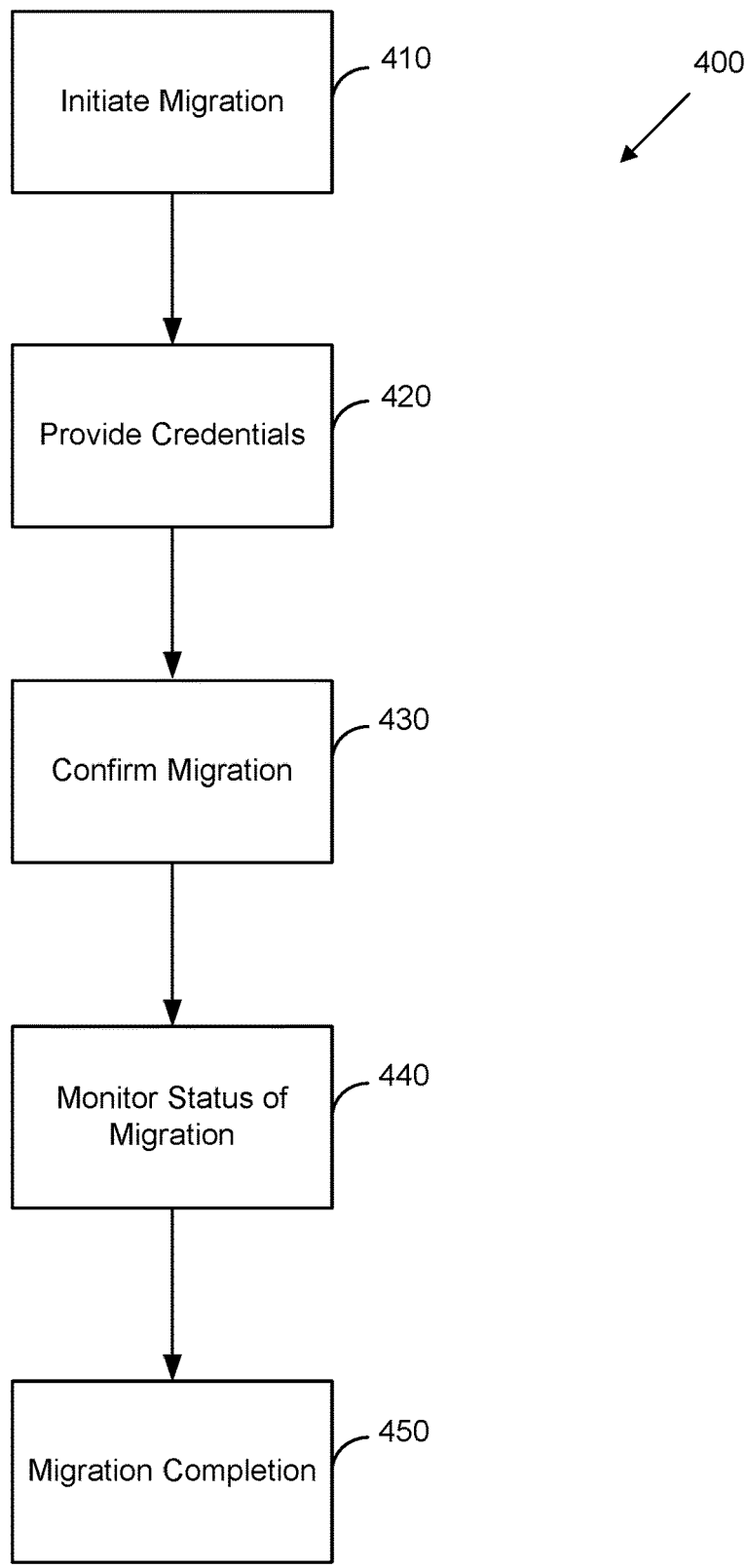
FIG. 4 shows an example method for a user to initiate migration of communication data.

Referring now to FIG. 4, an example method 400 for a user to migrate data from a source server to a target server is shown.

In one example, the method 400 is presented to the user as a wizard that assists the user through the migration process. For example, a wizard is provided that collects the necessary information to allow the migration to start. Additionally, the user can monitor the status of the migration and review any errors that may occur.

Initially, at operation 410, the user initiates the migration process. In one example, this can occur by having the user use the computing device 116 to contact the migration system 210 to request the migration of communication data from the communication server 111 to a remote server, such as the target server 130.

Next, at operation 420, the user provides the user's credentials to the migration system 210. In one example, this includes having the user provide the user's e-mail address and password for the communication server 111 in the source server 110. In this example, the user has permission to access all of the mailboxes on the communication server 111 for which migration is desired.

In addition to providing the user's credentials, the user can also select a maximum number of connections that are established with the source server 110. This allows the user to control possible overloading of the source server 110 as communication data is migrated. Example numbers of connections can be between 1 and 10.

As described further below, the migration system 210 uses the credentials to identify the information necessary to initiate communication with the communication server 111 and accomplish the migration.

Next, at operation 430, the user confirms the details of the migration before the migration process is initiated. For example, as described below, the user is presented with validation information such as the number of mailboxes and groups that are going to be migrated. The user can confirm this information to allow the migration system 210 to proceed with the migration.

Next, at operation 440, the user is able to monitor the status of the migration as the migration occurs. This includes presenting migration information, such as the progress of the migration to the user. See FIG. 6.

Finally, at operation 450, the migration process is completed. This can occur after all of the data has been migrated to the target server. This can also occur if the user decides to prematurely abort the migration process.

In one example, an e-mail report is sent to the user when migration is complete. Errors during populating and/or migration of data are sent with the e-mail report. There are two typical types of errors that can be reported: populating errors and data migration errors.

Possible populating failures can be during reading the remote directory structure on the source server, creating the associated object (mailbox, distribution list, etc.) on the target server, and setting the properties of the object. Data migration errors can include possible authentication errors, remote system connection errors, bad items encountered, and other errors.

Upon migration completion, the user is reminded to modify the delivery of email so that new email is delivered to the target server rather than the communication server 111. In one example, this involves having the user update the mail exchanger record (MX record), which is a record in the Domain Name System that specifies a mail server responsible for accepting email messages on behalf of the source server. In another example, "TargetAddress stamping" is used to modify delivery of emails. In this example, the NSPI protocol is used to add a TargetAddress property on the records for migrated users. Specifically, an "alternative" email address corresponding to the user in the target server is added. This alternative email address allows messages that are sent to the user on the source server to be automatically routed to the mailbox on the target server when migration is completed.

Figure 5:
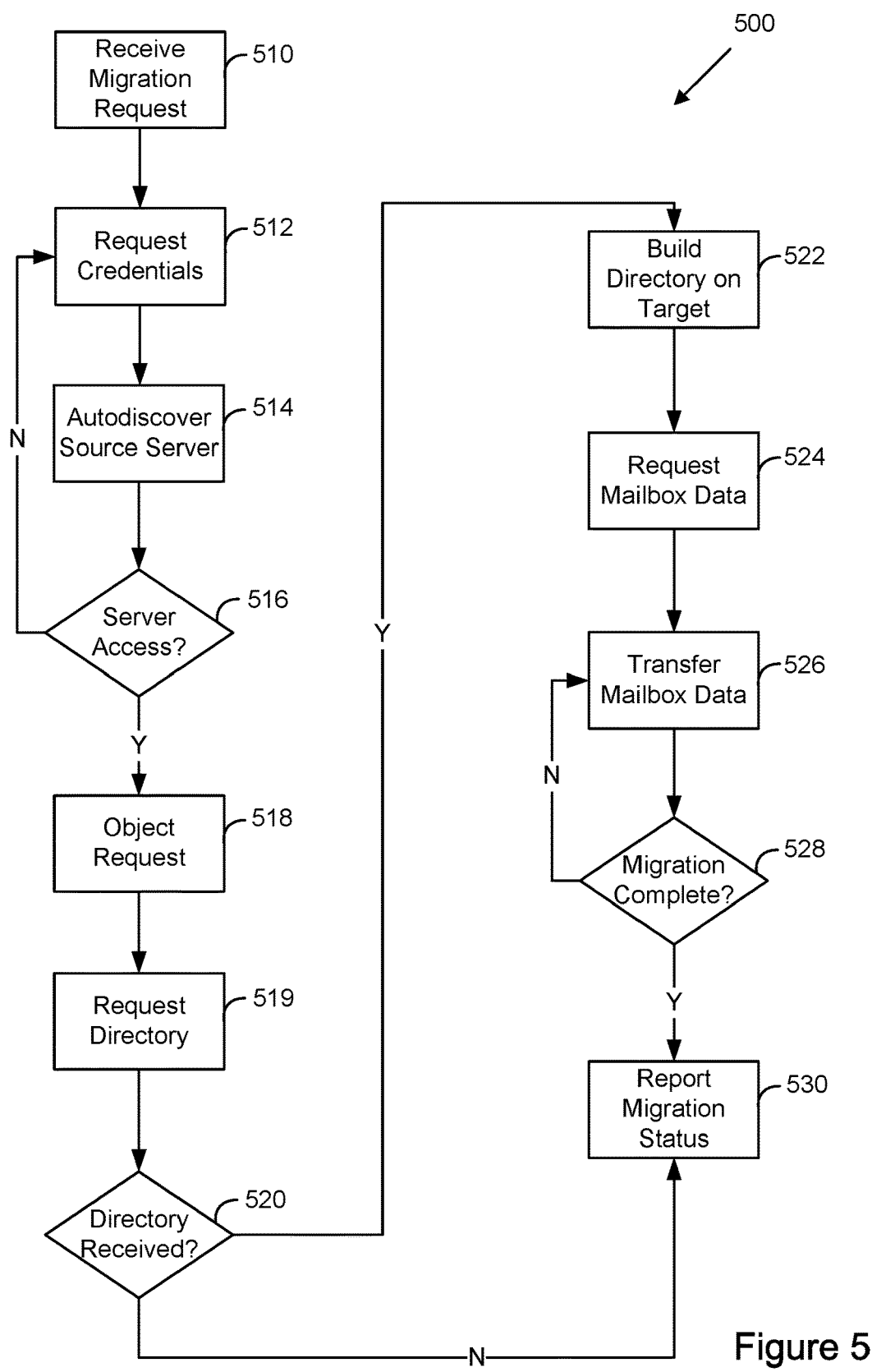
FIG. 5 shows an example method for migration of communication data.

Referring now to FIG. 5, an example method 500 for migrating data from a source server to a target server is shown. In one disclosed example, this involves the migration of communication data from a source server, such as the communication server 111 of the source server 110, to a target server, such as the target server 130.

Initially, at operation 510, a request for migration is received from a user. As previously noted, the migration process can be initiated by a user of the source server 110.

Next, at operation 512, the credentials of the user are requested. Typically, these credentials can include the user's email address and password for the communication server 111 in the source server 110.

Generally, once the user provides the user's credentials, the remaining steps of the method 500 can be done automatically with little or no input from the user.

Next, at operation 514, the credentials are used in an attempt to discover the relevant parameters associated with the source server 110. In this example, an Autodiscover Service from Microsoft Corporation is used to identify addressing information associated with the source server 110. The Autodiscover Service provides an automated mechanism for locating servers based on a user's email address. In this context, the Autodiscover service is used to identify the RPC/HTTP endpoint, Authentication Type support, whether SSL is supported by the source server, and the mail server name associated with the communication server 111. If the Autodiscover Service is successful, the source system is accessed using the user's credentials to verify access.

Next, at operation 516, a determination is made regarding whether or not the source server has been successfully accessed. If the source server has not been accessed successfully due to a failure in the Autodiscover Service or a failure in the credentials to provide access, control is passed back to operation 512. When prompting the user to re-input credentials, the user can also prompted to manually enter the source server settings, such as RPC/HTTP endpoint, Authentication type, etc.

If the server is successfully accessed at operation 516, control is instead passed to operation 518. At operation 518, a directory at the source server is queried to determine the number of objects (e.g., mailboxes, distribution lists, etc.) that are to be populated and migrated using the method 500. These numbers are provided to the user to confirm before migration begins.

In one example, this is accomplished by having the migration system query the source server over the Name Service Provider Interface (NSPI) protocol. The NSPI protocol provides messaging clients access to addressing data stored by a server, such as an Exchange Server. For example, the NSPI protocol is the protocol that the OUTLOOK® messaging and collaboration client from Microsoft Corporation uses to access address book data remotely.

The NSPI protocol is used by the migration system to get the number of recipient data stores that will be populated. In this example, the result is categorized into type of recipient (e.g., mailboxes, contacts, distribution groups). This information is then presented to the user.

Next, at operation 519, the directory structure at the source server is requested. In the example shown, this involves the migration system 210 requesting the directory structure from the communication server 111 using the NSPI protocol, as described above.

Next, at operation 520, a determination is made regarding whether or not the directory structure has been obtained from the source server. If not, control is passed to operation 530, and an error is indicated for the user.

Instead, if the directory structure is successfully obtained from the source server, control is instead passed to operation 522. At operation 522, the directory structure for the communication store is built on the target server. Generally, this is done by traversing the directory structure from the source server and populating mailboxes accordingly.

Specifically, a mailbox is created for each user and distribution list in the directory structure. Initially, a check is made to determine if a mailbox has already been created for a particular user (using aliases as well, as described below) or distribution list. If not, the mailbox is created on the target server. In one example, a random password is also assigned to each mailbox.

If a mailbox has already been created for a user, an error is generated. In addition, a check is made to determine if the address is a legacy address that was used to address the user on the source server. If so, the legacy address is assigned as an X500 proxy address associated with the user. In this manner, legacy addresses can continue to be used to address the user without creating undeliverable messages.

The populating in operation 522 can be modified if the entry in the directory structure has special properties. For example, if the entry in the directory structure is a resource, a mailbox is created on the target server with the appropriate property type, such as room or equipment, and the capacity property is set.

If the entry is a distribution group, a mailbox is created for the distribution group. A distribution group is created in a similar manner, except the group membership for the distribution group is maintained. A mapping is persisted between the group memberships defined on the source server and the new groups created on the target server. This mapping is used to rebuild the hierarchy associated within the groups, as described below. In addition, the identity of the group owner is noted and mapped to the corresponding user on the target server.

Once all objects have been populated on the target server, the group membership of each created distribution list is rebuilt. Because the group membership of each list is stored in the mapping of the source groups and target groups, a single pass over each populated list is done to add the appropriate group members.

Once the directory structure is built, control is passed to operation 526. At operation 526, the mailbox data is requested from the source server. In some examples, the mailbox data is requested in batches or per user mailbox. The data is populated based on the mailboxes that have been populated on the target server.

Finally, at operation 528, a determination is made regarding whether nor not mailbox data migration is complete. If not, control is passed back to operation 526. If so, control is instead passed to operation 530.

At operation 530, the completion of the migration is reported to the user. In some example, any errors associated with the migration process are also provided.

Figure 6:
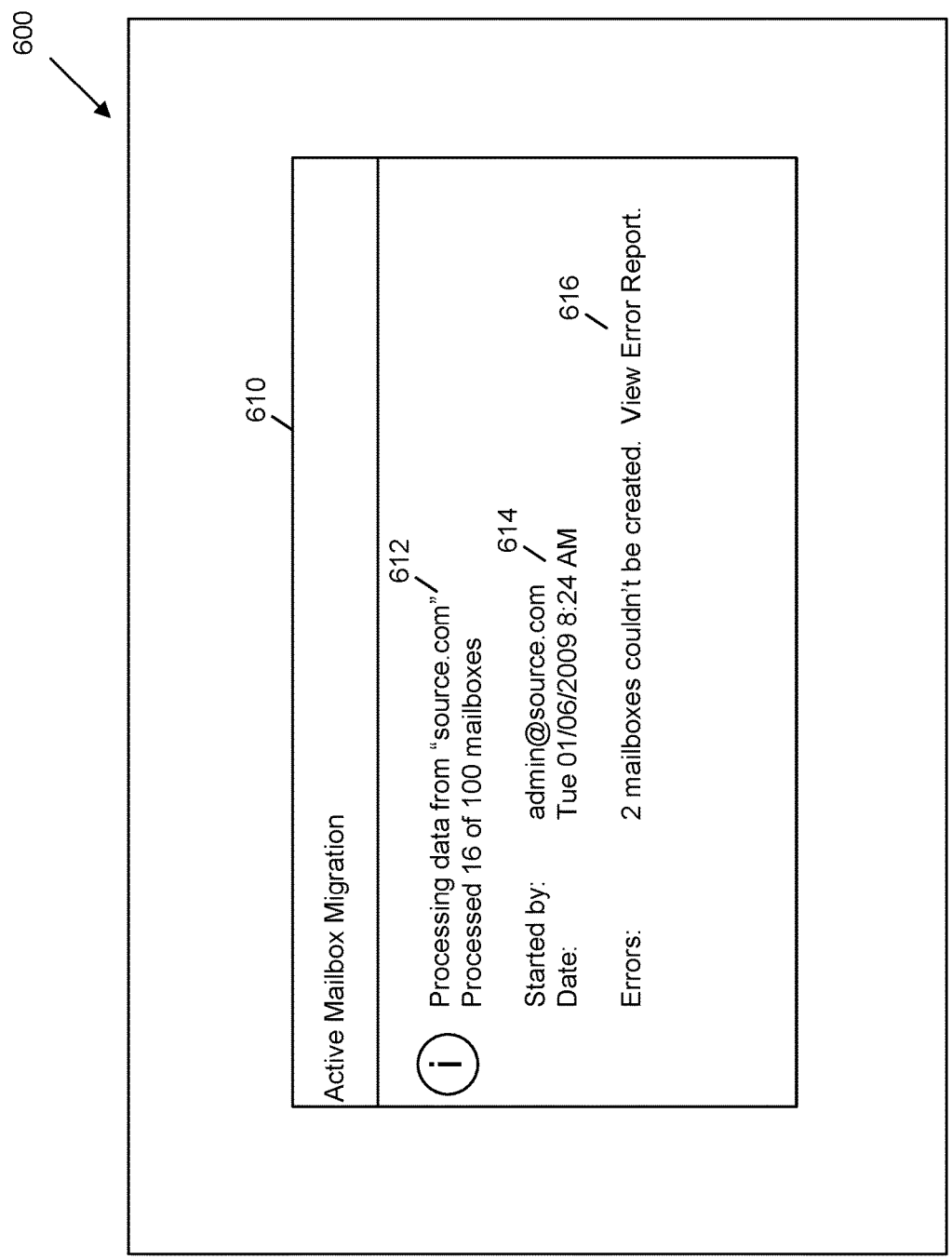
FIG. 6 shows an example user interface for a migration system.
Figure 2:
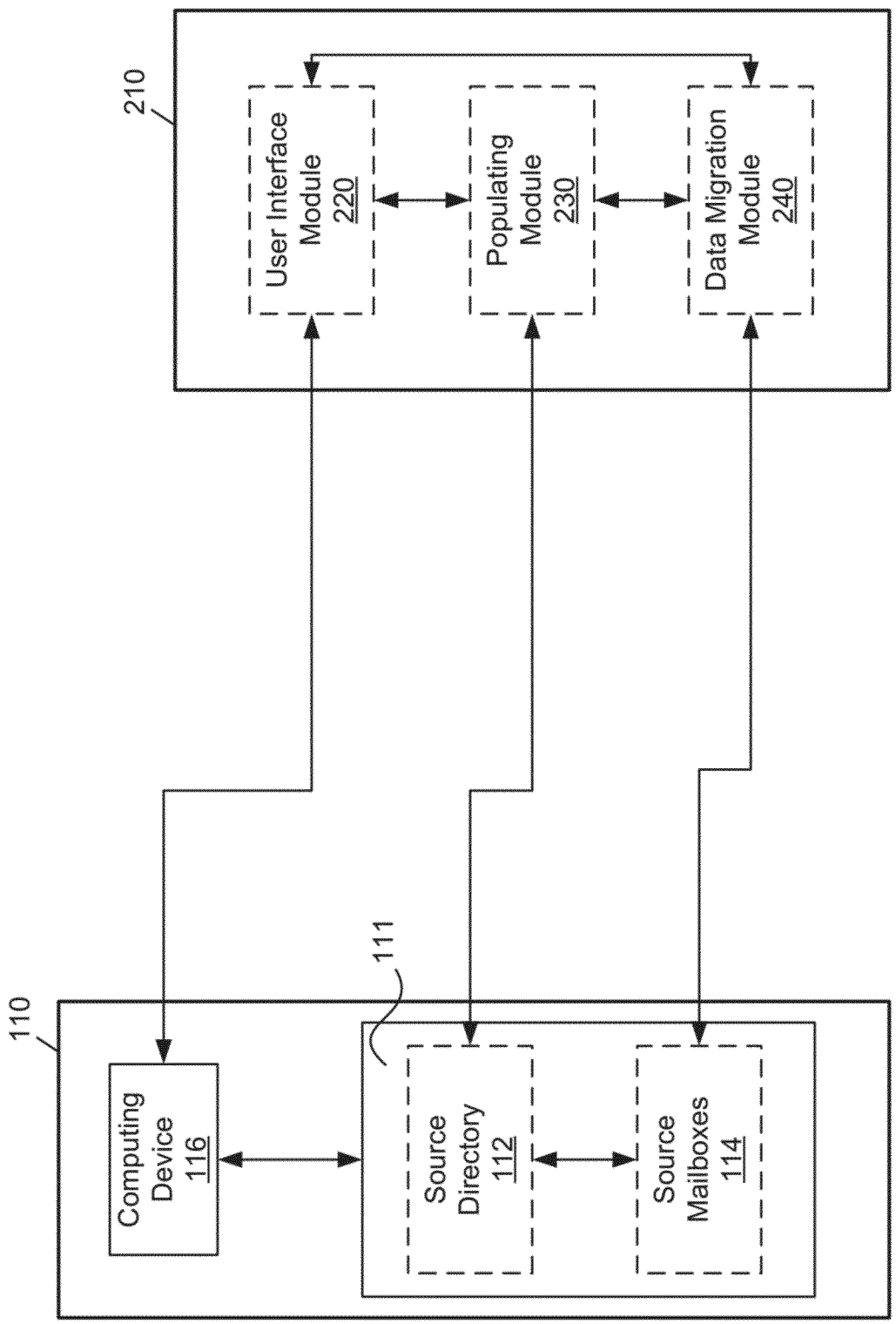

For example, referring now to FIG. 6, an example user interface 600 is shown. The user interface 600 includes a status window 610 displaying the status of the migration to the user. In this example, the status window 610 includes source information 612. The source information includes the location of the source data (e.g., "source.com") and the number of mailboxes processed (e.g., "16 of 100 mailboxes").

The status window 610 also includes initiation information 614 that provides the individual that started the migration (e.g., admin@source.com) and the time at which the migration was initiated (e.g., Tuesday, Jan. 6, 2009 at 8:24 AM). Finally, the status window 610 includes error information 616 that reports any errors associated with the migration to the user. In this example, two mailboxes could not be created on the target server. The user can select "View Error Report" to access a report detailing the errors.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

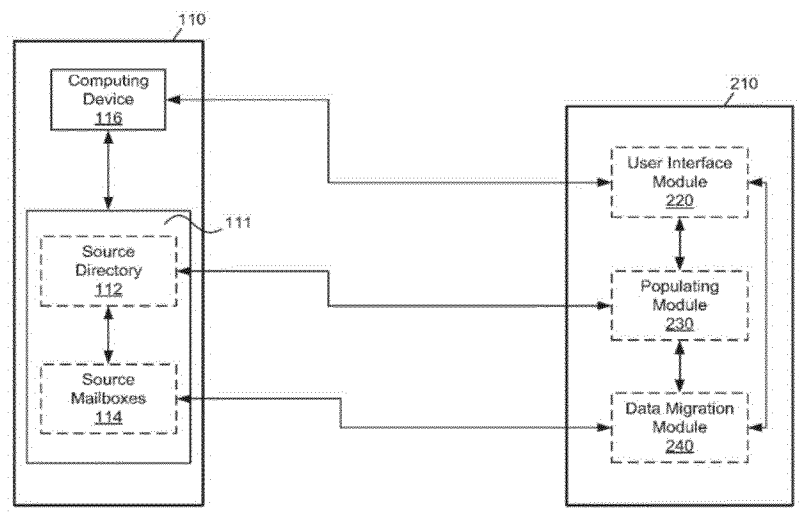

What is claimed is:
1. A method for migrating data, comprising:
   obtaining user credentials that provide access to a source system;
   receiving confirmation of details of a migration;

receiving details of a directory structure associated with the source system;

building at least a portion of the directory structure on a target system;

monitoring a status of the migration as the migration occurs, wherein the status of the migration includes an error report that is selectable to display error information associated with one or more of data migration errors or populating errors;

requesting communication data from the source system; and populating the target system with the communication data.

2. The method of claim 1, further comprising initiating the migration from the source system to the target system.

3. The method of claim 1, wherein obtaining the user credentials further comprises obtaining an email address from a user.

4. The method of claim 1, wherein the status of the migration includes information regarding a number of mailboxes processed.

5. The method of claim 1, wherein requesting the communication data from the source system includes requesting one or more of contacts, calendar items, and email messages.

6. The method of claim 5, wherein the email messages include all email items.

7. The method of claim 1, wherein the directory structure includes email addresses.

8. The method of claim 7, wherein populating the target system further comprises creating a mailbox for each of the email addresses.

9. A computing device, comprising:

a processing unit; and a system memory connected to the processing unit, the system memory including instructions that, when executed by the processing unit, cause the processing unit to:

obtain user credentials that provide access to a source system;

receive confirmation of details of a migration;

receive details of a directory structure associated with the source system;

build at least a portion of the directory structure on a target system;

monitor a status of the migration as the migration occurs, wherein the status of the migration includes an error report that is selectable to display error information associated with one or more of data migration errors or populating errors;

request communication data from the source system; and populate the target system with the communication data.

10. The computing device of claim 9, wherein the computing device is further programmed to initiate the migration from the source system to the target system.

11. The computing device of claim 9, wherein to obtain the user credentials further comprises obtaining an email address from a user.

12. The computing device of claim 9, wherein the status of the migration includes information regarding a number of mailboxes processed.

13. The computing device of claim 9, wherein to request the communication data from the source system includes requesting one or more of contacts, calendar items, and email messages.

14. The computing device of claim 13, wherein the email messages include all email items.

15. The computing device of claim 9, wherein the directory structure includes email addresses.

16. The computing device of claim 15, wherein to populate the target system further comprises creating a mailbox for each of the email addresses.

17. A computer readable storage device including computer instructions, which when executed by a processor, perform a method for migrating data from a source system to a target system, the method comprising:

obtaining user credentials that provide access to the source system;

receiving confirmation of details of a migration;

receiving details of a directory structure associated with the source system;

building at least a portion of the directory structure on the target system;

monitoring a status of the migration as the migration occurs, wherein the status of the migration includes an error report that is selectable to display error information associated with one or more of data migration errors or populating errors;

requesting communication data from the source system; and populating the target system with the communication data.

18. The computer readable storage device of claim 17, wherein obtaining the user credentials further comprises obtaining an email address from a user.

19. The computer readable storage device of claim 17, wherein requesting the communication data from the source system includes requesting one or more of contacts, calendar items, and email messages.

20. The computer readable storage device of claim 19, wherein the email messages include all email items.

* * * * *

UNITED STATES PATENT AND TRADEMARK OFFICE
CERTIFICATE OF CORRECTION

PATENT NO.         : 10,263,977 B2
APPLICATION NO.    : 15/707853
DATED              : April 16, 2019
INVENTOR(S)        : Kutlay Topatan et al.

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIG. 2 with FIG. 2 as shown on the attached page.

Signed and Sealed this
Fifth Day of November, 2019

Andrei Iancu
*Director of the United States Patent and Trademark Office*

CERTIFICATE OF CORRECTION (continued)

(12) United States Patent
Topatan et al.

(10) Patent No.: US 10,263,977 B2
(45) Date of Patent: *Apr. 16, 2019

(54) DIRECTORY DRIVEN MAILBOX MIGRATIONS

(71) Applicant: Microsoft Technology Licensing, LLC, Redmond, WA (US)

(72) Inventors: Kutlay Topatan, Seattle, WA (US); Maxim Ivanov, Redmond, WA (US); Victor Boctor, Redmond, WA (US); Palash Biswas, Redmond, WA (US); Bernard Luke Gallagher, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/707,853

(22) Filed: Sep. 18, 2017

(65) Prior Publication Data
US 2018/0007036 A1 Jan. 4, 2018

Related U.S. Application Data

(63) Continuation of application No. 13/007,095, filed on Jan. 14, 2011, now Pat. No. 9,769,150.

(51) Int. Cl.
G06Q 10/10 (2012.01)
H04L 29/06 (2006.01)
H04L 12/58 (2006.01)

(52) U.S. Cl.
CPC ....... H04L 63/0823 (2013.01); G06Q 10/107 (2013.01); H04L 51/22 (2013.01)

(58) Field of Classification Search
CPC .... H04L 63/0823; H04L 51/22; G06Q 10/107
See application file for complete search history.

(56) References Cited

U.S. PATENT DOCUMENTS 6,938,039 B1 * 8/2005 Bober ............... G06F 17/30079
707/704
8,122,085 B2 2/2012 Midgley
8,856,376 B1 10/2014 Watson et al.
(Continued)

OTHER PUBLICATIONS

"[MS-OXMVMBX]: Mailbox Migration Protocol Specification" v1.0, Microsoft Corporation © 2008, 8 pages.
(Continued)

*Primary Examiner* — Farid Homayounmehr
*Assistant Examiner* — Zhimei Zhu
(74) *Attorney, Agent, or Firm* — Merchant & Gould

(57) ABSTRACT

An example method for migrating communication data from a source server to a target server includes obtaining, using a computing device, a set of credentials to access the source server, and accessing the source server using the set of credentials. The method also includes requesting, automatically by the computing device, a directory structure associated with communication data from the source server, populating, by the computing device, the target server using the directory structure, requesting the communication data from the source server, and populating the target server with the communication data.

20 Claims, 6 Drawing Sheets